United States Patent
Wang et al.

(10) Patent No.: US 10,937,186 B2
(45) Date of Patent: Mar. 2, 2021

(54) TECHNIQUES FOR PRECISELY LOCATING LANDMARKS IN MONOCULAR CAMERA IMAGES WITH DEEP LEARNING

(71) Applicants: Zijian Wang, Troy, MI (US); Stephen Horton, Rochester, MI (US)

(72) Inventors: Zijian Wang, Troy, MI (US); Stephen Horton, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 168 days.

(21) Appl. No.: 16/224,930

(22) Filed: Dec. 19, 2018

(65) Prior Publication Data
US 2020/0202548 A1    Jun. 25, 2020

(51) Int. Cl.
 G06T 7/00    (2017.01)
 G06T 7/70    (2017.01)
 (Continued)

(52) U.S. Cl.
 CPC ............. G06T 7/70 (2017.01); G05D 1/0246 (2013.01); G05D 1/0278 (2013.01);
 (Continued)

(58) Field of Classification Search
 CPC combination set(s) only.
 See application file for complete search history.

(56) References Cited

U.S. PATENT DOCUMENTS 10,331,974 B2 * 6/2019 Zia .................... G06N 3/0454
10,452,960 B1 * 10/2019 Li ......................... G06N 7/005
10,495,753 B2 * 12/2019 Melvin ..................... G01S 7/20
10,684,626 B1 * 6/2020 Martin .............. B60W 60/0015
2018/0130355 A1 * 5/2018 Zia ......................... B60W 30/00
(Continued)

FOREIGN PATENT DOCUMENTS

| CN | 102508246 B | 4/2013 |
|---|---|---|
| CN | 102682455 B | 11/2014 |
| WO | 201807793 A1 | 1/2018 |

OTHER PUBLICATIONS

Aguilar Wilbert G et al: "convolutional Neuronal Networks Based Monocular Object Detection and Depth Perception for Micro UAVs", Nov. 9, 2018 (Nov. 9, 2018), Robocup 2008: Robot Soccer World Cup XII; [Lecture Notes for Computer Science; Lect. Notes Computer], Springer International Publishing, Cham, pp. 401-410, XP047493528, ISBN: 978-3-319-10403-4 [retrieved on Nov. 9, 2018] the whole document.
(Continued)

*Primary Examiner* — Iman K Kholdebarin
(74) *Attorney, Agent, or Firm* — Ralph E Smith (57) ABSTRACT

Advanced driver assistance (ADAS) systems and methods for a vehicle comprise capturing an image using a monocular camera system of the vehicle and detecting a landmark in the image using a deep neural network (DNN) trained with labeled training data including generating a bounding box for the detected landmark, predicting a depth of pixels in the image using a convolutional neural network (CNN) trained with unlabeled training data captured by a stereo camera system, filtering noise by averaging predicted pixel depths for pixels in the region of the bounding box to obtain an average depth value for the detected landmark, determining a coordinate position of the detected landmark using its average depth value, and performing at least one ADAS feature using the determined coordinate position of the detected landmark.

18 Claims, 5 Drawing Sheets

(51) Int. Cl.
| | |
|---|---|
| *G06T 7/50* | (2017.01) |
| *G05D 1/02* | (2020.01) |
| *G06K 9/62* | (2006.01) |
| *G06T 5/00* | (2006.01) |
| *G06T 5/20* | (2006.01) |

(52) U.S. Cl.
CPC ......... *G05D 1/0289* (2013.01); *G06K 9/6228* (2013.01); *G06K 9/6253* (2013.01); *G06K 9/6257* (2013.01); *G06K 9/6259* (2013.01); *G06T 5/002* (2013.01); *G06T 7/50* (2017.01); *G06T 5/20* (2013.01); *G06T 2207/10004* (2013.01); *G06T 2207/20081* (2013.01); *G06T 2207/20084* (2013.01); *G06T 2207/30252* (2013.01)

(56) References Cited

U.S. PATENT DOCUMENTS

| | | | | |
|---|---|---|---|---|
| 2019/0056498 | A1* | 2/2019 | Sonn | G01S 17/89 |
| 2019/0219401 | A1* | 7/2019 | Daniilidis | G01C 21/18 |
| 2019/0238819 | A1* | 8/2019 | Furukawa | G06T 15/205 |
| 2019/0265703 | A1* | 8/2019 | Hicok | G05B 13/027 |
| 2019/0271550 | A1* | 9/2019 | Breed | G08G 1/147 |
| 2020/0033456 | A1* | 1/2020 | Wang | G04F 10/005 |
| 2020/0086879 | A1* | 3/2020 | Lakshmi Narayanan | G06N 3/0445 |
| 2020/0089977 | A1* | 3/2020 | Lakshmi Narayanan | G06K 9/629 |
| 2020/0175311 | A1* | 6/2020 | Xu | H04N 7/181 |

OTHER PUBLICATIONS

Sharma Kajal Ed—Xu Zheng et al: "Improved visual SLAM: anovel approach to mapping and localization using visual landmarks in consecutive frames", Multimedia Tools and Applications, Kluwer Acedemis Publishers, Boston, US, vol. 77, No. 7, Apr. 19, 2017 (Apr. 19, 2017), pp. 7955-7976, XP036473939, ISSN: 1380-7501, DOI: 10.10071S11042-017-4694-X [retrieved on Apr. 19, 2017] abstract Section 3.2.

Clement Godard et al: "Unsupervised Monocular Depth Estimation with Left-Right Consistency", Apr. 12, 2017 (Apr. 12, 2017), XP055601453, DOI: 10.1109/CVPR.2017.699 retrieved from the internet: URL:https//arxiv.org/abs/1609.03677 [retrieved on Jul. 2, 2019] abstract Section 2, "Unsupervised Depth Estimation" Section 3.

Ravi Garg et al: "Unsupervised CNN for Single View Depth Estimation: Geometry to the Rescue", Mar. 20, 2018 (Mar. 20, 2018), XP055601450, DOI: 10.1007/978-3-31946484-845 Retrieved from the internet: URL:https://arxiv.org/abs/1603.04992 [retrieved on Jul. 2, 2019] the whole documentt.

International Search Report and Written Opinion dated Apr. 9, 2020 for International Application No. PCT/US2019/066449, International Filing Date Dec. 16, 2019.

Dagen, Erez et al., Forward Collision Warning with a Single Camera:, p. 1-6.

Godard, Clement et al., "Unsupervised Monocular Depth Estimation with Left-Right Consistency", http://visual.cs.ucl.ac.uk/pubs/monoDepth/, p. 1-10.

Lee, Tae-Jae et al., "A Monocular Vision Sensor-Based Obstacle Detection Algorithm for Autonomous Robots", p. 1-19 (2016).

Michels, Jeff et al., "High Speed Obstacle Avoidance using Monocular Vision and Reinforcement Learning", Computer Science Department, Stanford University, p. 1-8.

Taylor, T, et al., "Monocular Vision as a Range Sensor", p. 566-575, CIMCA 20041 Proceedings/ ISBN: 1740881885 M. Mohammadian (Ed.) (2004).

\* cited by examiner

TECHNIQUES FOR PRECISELY LOCATING LANDMARKS IN MONOCULAR CAMERA IMAGES WITH DEEP LEARNING

FIELD

The present application generally relates to vehicle advanced driver assistance (ADAS) systems and methods and, more particularly, to techniques for precisely locating landmarks in monocular camera images with deep learning.

BACKGROUND

An advanced driver assistance system (ADAS) of a vehicle could leverage a known coordinate position of a landmark for various ADAS features such as, but not limited to, localizing a position of the vehicle on a global positioning system (GPS) map. This is because landmarks are unique static structures that typically have known coordinates on the GPS map. Conventional ADAS utilize stereo or kinetic camera systems and/or a light detection and ranging (LIDAR) system in order to accurately determine a depth of a detected landmark. These devices are more expensive than conventional monocular (i.e., single lens) camera systems and also require substantial calibration/tuning and post-processing power. Conventional ADAS, however, are unable to determine the landmark depth using monocular camera images. Accordingly, while such ADAS systems do work for their intended purpose, there remains a need for improvement in the relevant art.

SUMMARY

According to one example aspect of the invention, an advanced driver assistance system (ADAS) for a vehicle is presented. In one exemplary implementation, the ADAS comprises: a monocular camera system configured to capture an image and a controller configured to: receive the image, detect a landmark in the image using a deep neural network (DNN) trained with labeled training data including generating a bounding box for the detected landmark, predict a depth of pixels in the image using a convolutional neural network (CNN) trained with unlabeled training data captured by a stereo camera system, filter noise by averaging predicted pixel depths for pixels in the region of the bounding box to obtain an average depth value for the detected landmark, determine a coordinate position of the detected landmark using its average depth value, and perform at least one ADAS feature using the determined coordinate position of the detected landmark.

In some implementations, the determined coordinate position of the detected landmark is a polar coordinate position comprising the average depth value and an angle from the monocular camera system to a center of the detected landmark. In some implementations, the averaging of the predicted pixel depths in the region of the bounding box comprises applying an averaging filter. In some implementations, the CNN is configured to predict a depth of every pixel of the image.

In some implementations, the ADAS feature comprises localizing a position of the vehicle on a global positioning system (GPS) map to the determined polar coordinate position. In some implementations, the ADAS feature comprises collision avoidance during an autonomous driving mode.

In some implementations, the unlabeled training data comprises pairs of simultaneously captured left and right images. In some implementations, the controller is further configured to perform vehicle-to-vehicle transfer learning to further train the DNN. In some implementations, the labeled training data comprises a plurality of images of different types of landmarks that are manually labeled by a human annotator.

In some implementations, none of a stereo camera system, a kinetic camera system, and a light detection and ranging (LIDAR) system are used by the controller to predict the depth of the detected landmark.

According to another example aspect of the invention, a method of detecting a landmark from an image captured by a monocular camera system of a vehicle is presented. In one exemplary implementation, the method comprises: capturing, by the monocular camera system, the image, receiving, by a controller of the vehicle, the image, detecting, by the controller, a landmark in the image using a DNN trained with labeled training data including generating a bounding box for the detected landmark, predicting, by the controller, a depth of pixels in the image using a CNN trained with unlabeled training data captured by a stereo camera system, filtering, by the controller, noise by averaging predicted pixel depths for pixels in the region of the bounding box to obtain an average depth value for the detected landmark, determining, by the controller, a coordinate position of the detected landmark using its average depth value, and performing, by the controller, at least one ADAS feature using the determined coordinate position of the detected landmark.

In some implementations, the determined coordinate position of the detected landmark is a polar coordinate position comprising the average depth value and an angle from the monocular camera system to a center of the detected landmark. In some implementations, the averaging of the predicted pixel depths in the region of the bounding box comprises applying an averaging filter. In some implementations, the CNN is configured to predict a depth of every pixel of the image.

In some implementations, the ADAS feature comprises localizing a position of the vehicle on a GPS map to the determined polar coordinate position. In some implementations, the ADAS feature comprises collision avoidance during an autonomous driving mode.

In some implementations, the unlabeled training data comprises pairs of simultaneously captured left and right images. In some implementations, the method further comprises performing, by the controller, vehicle-to-vehicle transfer learning to further train the DNN. In some implementations, the labeled training data comprises a plurality of images of different types of landmarks that are manually labeled by a human annotator.

In some implementations, none of a stereo camera system, a kinetic camera system, and a LIDAR system are used by the controller to predict the depth of the detected landmark.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there exists a need for improvement in automated driver assistance system (ADAS) landmark detection. It will be appreciated that the term "ADAS" as used herein includes driver assistance systems (lane keeping, collision avoidance, adaptive cruise control, etc.) as well as partially and fully autonomous driving systems. As discussed above, conventional ADAS utilize stereo camera systems, kinetic camera systems, and/or light detection and ranging (LIDAR) systems for landmark detection because these systems are unable to detect landmark distance/depth using a less expensive monocular camera. This also increases calibration and processing costs. Accordingly, techniques are presented that utilize a unique architecture to accurately detect landmarks from images captured by a monocular camera system.

A deep neural network (DNN) is configured to detect landmarks (e.g., bounding boxes) and is trained using labeled training data annotated by a human annotator. The depth or range of a detected landmark, however, cannot be easily or accurately calculated from a single monocular camera image. A convolutional neural network (CNN) configured to predict the depth of each pixel in the image and is therefore trained using unlabeled stereo camera system images and utilized to predict the depth of detected landmarks in the image. Using this information, a coordinate position (e.g., a polar coordinate) of the landmark is determined and utilized for an ADAS feature, such as localization of the vehicle position on a global positioning system (GPS) map.

Figure 1:
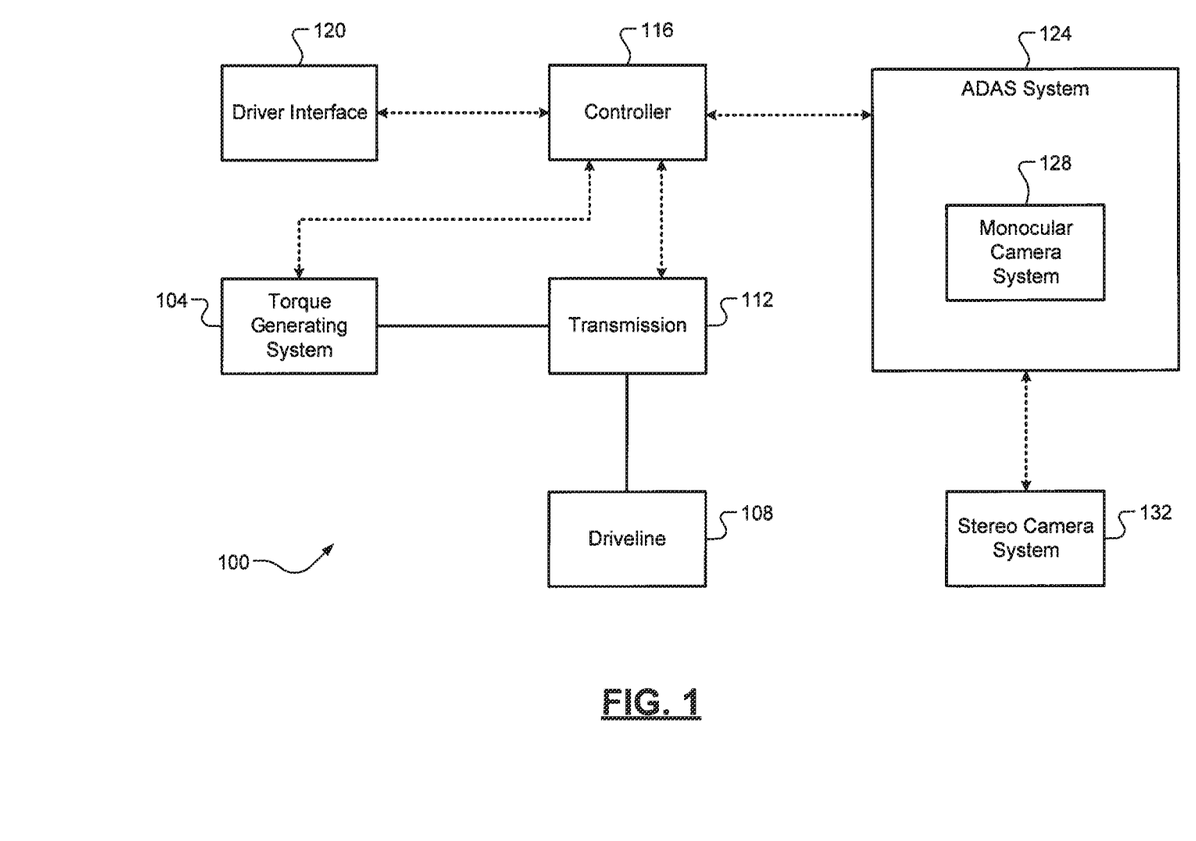
FIG. 1 is a functional block diagram of an example vehicle having an advanced driver assistance system (ADAS) according to the principles of the present disclosure.

Referring now to FIG. 1, a functional block diagram of an example vehicle 100 is illustrated. The vehicle 100 comprises a torque generating system 104 (an engine, an electric motor, combinations thereof, etc.) that generates drive torque that is transferred to a driveline 108 via a transmission 112. A controller 116 controls operation of the torque generating system 104, such as to generate a desired drive torque based on a driver input via a driver interface 120 (a touch display, an accelerator pedal, combinations thereof, etc.). The vehicle 100 further comprises an ADAS 124 having a monocular camera system 128. The monocular camera system 128 could be mounted, for example, in a front windshield of the vehicle 100. While the ADAS 124 is illustrated as being separate from the controller 116, it will be appreciated that the ADAS 124 could be incorporated as part of the controller 116, or the ADAS 124 could have its own separate controller.

The ADAS 124 optionally includes other systems, such as, but not limited to, a radio detection and ranging (RADAR) system, a LIDAR system, an inertial motion unit (IMU) system, and a real-time kinematic (RTK) system. The ADAS 124 or controller 116 of the present disclosure does not require a very high powered processor that would be required for stereo camera system, kinetic camera system, or LIDAR based landmark detection solutions. A stereo camera system 132 is utilized, however, for training of a CNN, but this training data could be captured and utilized for training external to the vehicle 100.

Figure 2A:
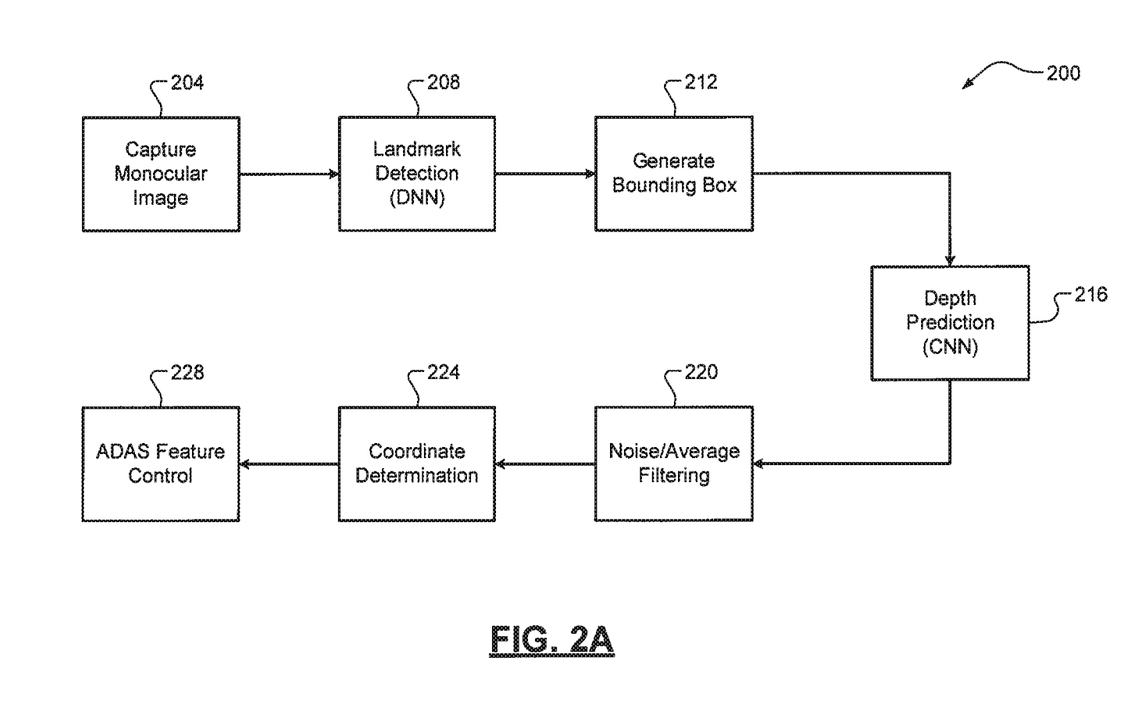
FIGS. 2A-2C are functional block diagrams an example landmark detection and depth prediction architecture and model training architectures according to the principles of the present disclosure.

Referring now to FIG. 2A, a functional block diagram of an example landmark detection and depth prediction architecture 200 is illustrated. At 204, an image is captured (e.g., using monocular camera system 128). At 208, landmark detection is performed using the image and a trained DNN. At 212, a bounding box is generated around the detected landmark. It will be appreciated that 208 and 212 could be represented as a single operation as the bounding box for each detected landmark will be continuously detected in each image. At 216, depth prediction is performed for every pixel in the image using the trained CNN. It will be appreciated that this depth prediction process could be performed in parallel with the landmark detection and bounding box generation processes. More particularly, the bounding box can be used to look up depth values from the set of all depth values predicted by the trained CNN for the particular image.

At 220, noise/average filtering is performed to create a smooth surface of the pixels in the region of the bounding box. At 224, a coordinate position (e.g., a polar coordinate) of the detected landmark is determined. This could include, for example, determining a coordinate pair (r, θ) having an angle (θ) along a range line from the monocular camera system 128 to a center of the detected landmark and the predicted depth (r). In some embodiments, an average depth is calculated from a set of depth values determined for a particular bounding box, and this average depth is utilized as the predicted depth r. The range line can be formed, for example, by knowing a position/configuration of the monocular camera system 128 with respect to the vehicle 100. At 228, at least one ADAS feature is performed using the determined coordinate position of the detected landmark. For example only, a position of the vehicle 100 on a GPS map (e.g., a high definition, or HD map) could be localized based on the known position of the detected landmark relative to the vehicle 100. It will be appreciated that other features could also leverage this information, such as collision avoidance during an autonomous driving mode.

Figure 2B:
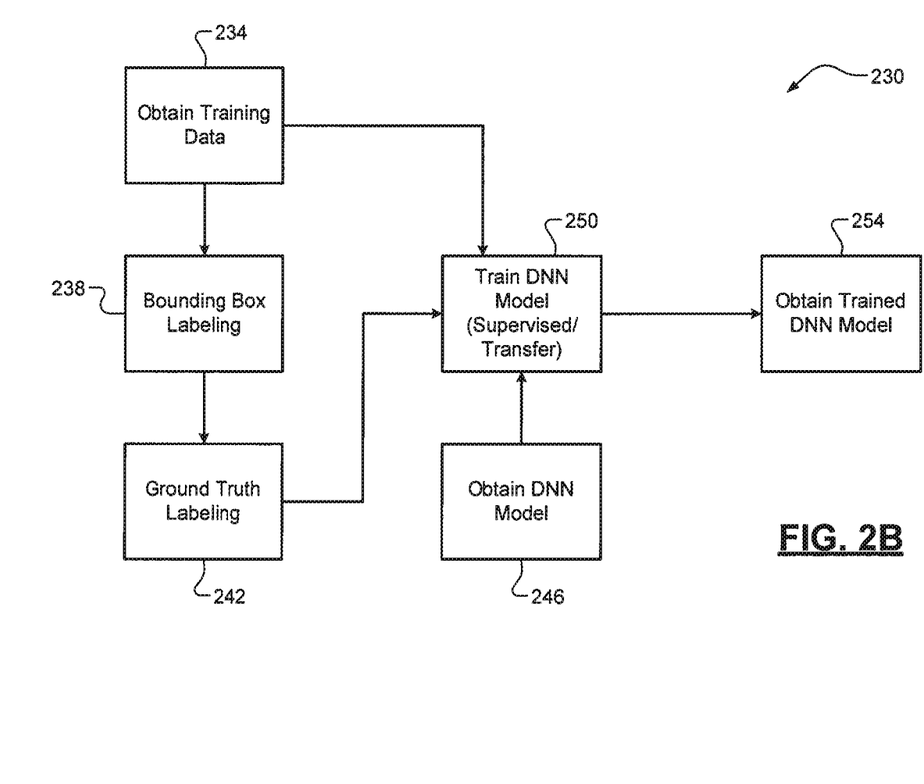
Figure 2C:
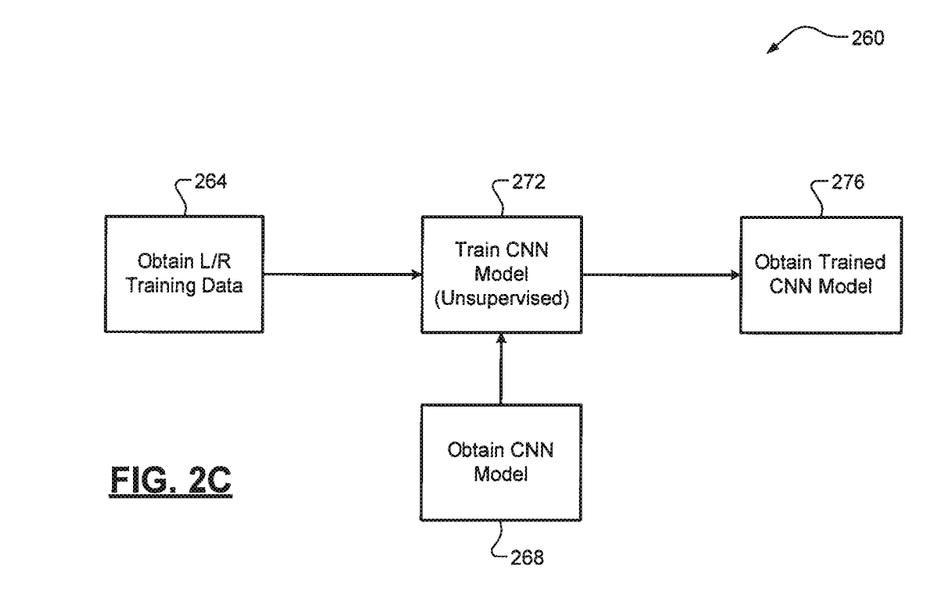

Referring now to FIGS. 2B-2C, training architectures 230, 260 for the DNN and the CNN, respectively, are illustrated. In FIG. 2B, training data is obtained at 234. This training data includes monocular camera images, which are then manually labeled (e.g., by a human annotator) at 238 and 242 to indicate the bounding boxes and a ground truths for each landmark, respectively. At 246, an untrained DNN model is obtained. The parameters for the DNN, such as the number of hidden layers, the number of neurons per layer, transfer functions, and the like could be optimized for each particular application. At 250, the data and the untrained model are combined and training is performed. This training is supervised because the training data has been labeled. It will also be appreciated, however, that the DNN model training could involve vehicle-to-vehicle transfer learning to further enhance the performance of the DNN model.

At 254, the trained DNN model is finally obtained. In one exemplary implementation, the DNN model is based on the Faster R-CNN model, which is faster than previous models such as Fast R-CNN and R-CNN and thus is much more suitable for real-time object detection as is necessary in vehicle autonomous driving. In Faster R-CNN, the image is provided as an input to a CN which provides a convolutional feature map. Instead of using selective search algorithm on the feature map to identify the region proposals, a separate network is used to predict the region proposals. The predicted region proposals are then reshaped using an ROI pooling layer, which is then used to classify the image within the proposed region and predict the offset values for the bounding boxes.

In one exemplary implementation, a pooling layer, some fully-connected layers, and a Softmax classification layer and bounding box regressor are added to the Faster R-CNN based DNN model. As previously discussed, even the trained DNN model is incapable of accurately determining the depth of detected landmarks in a single monocular camera image. Therefore, a separately trained CNN is utilized to predict the depth of each pixel in each monocular camera image, e.g., to then determine a polar coordinate position of each detected landmark.

In FIG. 2C, training data for an untrained CNN model is obtained at 264. This training data includes left and right (L/R) images captured by a stereo camera system (e.g., stereo camera system 132). This data is not labeled and is combined along with an untrained CNN model from 268 for training at 272. Stereo camera training data is necessary because the ground truth of depth for a particular monocular camera image would be otherwise difficult to label and then utilize for training of the CNN model. While human annotators are able to perform depth estimation by exploiting cues such as perspective, scaling relative to the known sizes of objects, lighting/shading appearance, and the like, this would be a very burdensome annotation task that would increase costs. As previously noted, however, this training data could instead be captured by a stereo camera system separate from the vehicle 100, such as part of a training or calibration system. In this regard, the vehicle 100 is not required to include this type of more expensive camera system.

The parameters for the CNN, such as convolutional/pooling layer configurations, receptive fields, weights, and the like, could be similarly optimized for each particular application. The training at 272 is unsupervised because the training data does not require labeling as the depth of various objects can be determined based on rectified stereo image pairs (e.g., a known relative orientation of the left and right lenses) and thus supervision in the form of ground truth labeling is not required. At 276, the trained CNN model is finally obtained.

Figure 3:
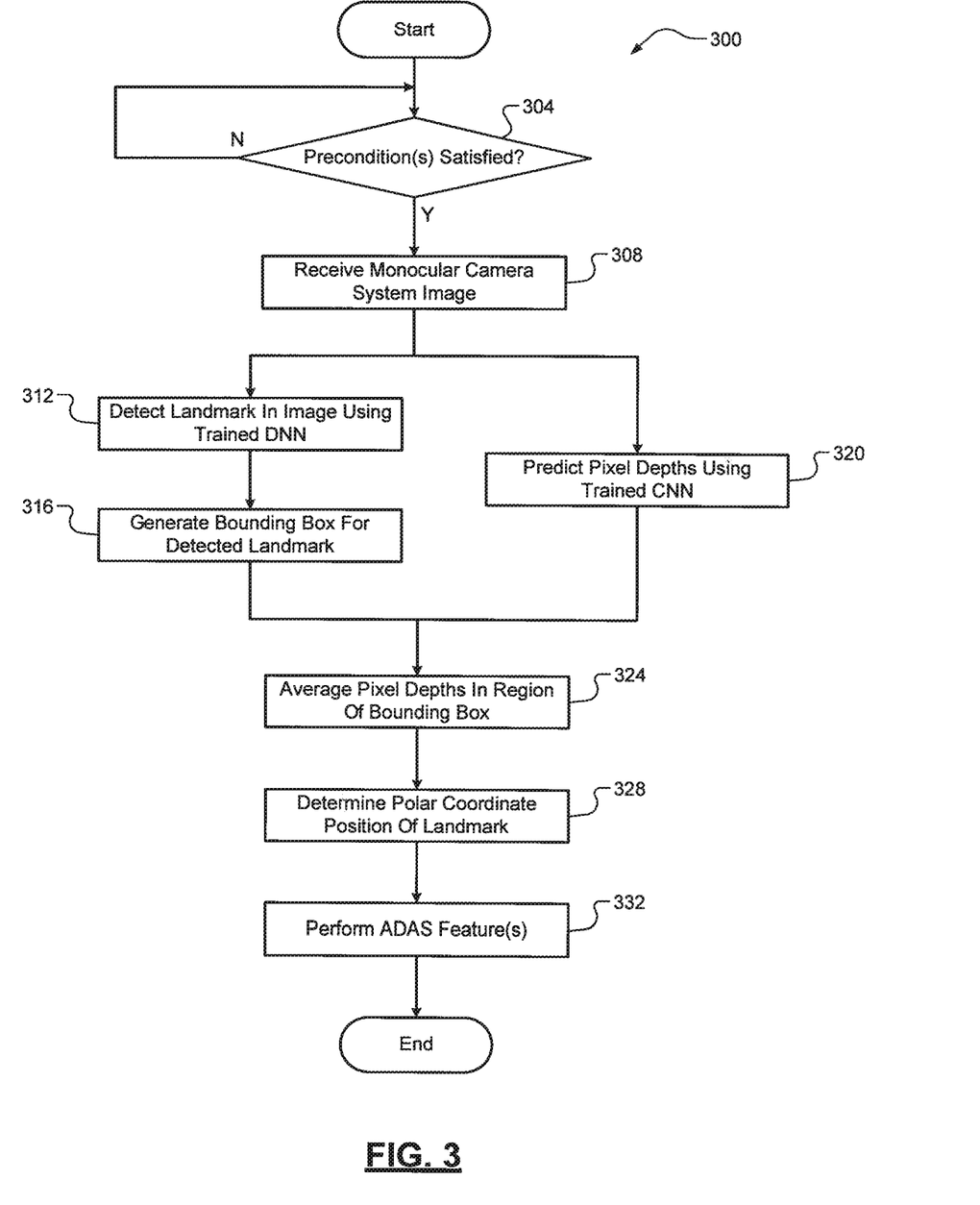
FIG. 3 is a flow diagram of an example method of detecting a landmark from an image captured by a monocular camera system of a vehicle according to the principles of the present disclosure.

Referring now to FIG. 3, a flow diagram of an example method 300 of landmark detection and depth prediction is illustrated. At optional 304, one or more precondition(s) are checked to have been satisfied. This could include, for example, the fully trained DNN and CNN models having been loaded to the ADAS system 124 or controller 116 and the vehicle 100 being in operation. When the precondition(s) are satisfied, the method 300 proceeds to 308. Otherwise, the method 300 ends or returns to 304. At 308, the controller 116 receives an image captured by the monocular camera system 128. The method 300 then splits into two paths. In a first path at 312, the controller 116 uses the trained DNN model and the image to detect a landmark. Then, at 316, the controller 116 generates a bounding box around the detected landmark. It will be appreciated that 312 and 316 could both be part of a single operation.

In a second path at 320, the controller 116 predicts a depth of every pixel in the image using the trained CNN model. By performing operation 320 in parallel with operations 312 and 316, total processing time can be decreased. At 324, the controller 116 filters noise by smoothing or averaging the pixels in the region of the bounding box. At 328, the controller 116 determines a polar coordinate position (r, θ) of the detected landmark. At 332, the controller 116 utilizes the determined polar coordinate position of the detected landmark for one or more ADAS features (vehicle position localization on a GPS map, autonomous driving collision avoidance, etc.). The method 300 then ends or returns to 304.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An advanced driver assistance system (ADAS) for a vehicle, the ADAS comprising:
   a monocular camera system configured to capture an image; and
   a controller configured to:
      receive the image;
      detect a landmark in the image using a deep neural network (DNN) trained with labeled training data including generating a bounding box for the detected landmark;
      predict a depth of pixels in the image using a convolutional neural network (CNN) trained with unlabeled training data captured by a stereo camera system;
      filter noise by averaging predicted pixel depths for pixels in the region of the bounding box to obtain an average depth value for the detected landmark;
      determine a coordinate position of the detected landmark using its average depth value; and
      perform at least one ADAS feature using the determined coordinate position of the detected landmark.

2. The ADAS of claim 1, wherein the determined coordinate position of the detected landmark is a polar coordinate position comprising the average depth value and an angle from the monocular camera system to a center of the detected landmark.

3. The ADAS of claim 2, wherein the ADAS feature comprises localizing a position of the vehicle on a global positioning system (GPS) map to the determined polar coordinate position.

4. The ADAS of claim 1, wherein the ADAS feature comprises collision avoidance during an autonomous driving mode.

5. The ADAS of claim 1, wherein the averaging of the predicted pixel depths in the region of the bounding box comprises applying an averaging filter.

6. The ADAS of claim 1, wherein the CNN is configured to predict a depth of every pixel of the image.

7. The ADAS of claim 1, wherein the unlabeled training data comprises pairs of simultaneously captured left and right images.

8. The ADAS of claim 1, wherein the controller is further configured to perform vehicle-to-vehicle transfer learning to further train the DNN.

9. The ADAS of claim 1, wherein the labeled training data comprises a plurality of images of different types of landmarks that are manually labeled by a human annotator.

10. A method of detecting a landmark from an image captured by a monocular camera system of a vehicle, the method comprising:
    capturing, by the monocular camera system, the image;
    receiving, by a controller of the vehicle, the image;
    detecting, by the controller, a landmark in the image using a deep neural network (DNN) trained with labeled training data including generating a bounding box for the detected landmark;
    predicting, by the controller, a depth of pixels in the image using a convolutional neural network (CNN) trained with unlabeled training data captured by a stereo camera system;
    filtering, by the controller, noise by averaging predicted pixel depths for pixels in the region of the bounding box to obtain an average depth value for the detected landmark;
    determining, by the controller, a coordinate position of the detected landmark using its average depth value; and
    performing, by the controller, at least one advanced driver assistance system (ADAS) feature using the determined coordinate position of the detected landmark.

11. The method of claim 10, wherein the determined coordinate position of the detected landmark is a polar coordinate position comprising the average depth value and an angle from the monocular camera system to a center of the detected landmark.

12. The method of claim 11, wherein the ADAS feature comprises localizing a position of the vehicle on a global positioning system (GPS) map to the determined polar coordinate position.

13. The method of claim 10, wherein the ADAS feature comprises collision avoidance during an autonomous driving mode.

14. The method of claim 10, wherein the averaging of the predicted pixel depths in the region of the bounding box comprises applying an averaging filter.

15. The method of claim 10, wherein the CNN is configured to predict a depth of every pixel of the image.

16. The method of claim 10, wherein the unlabeled training data comprises pairs of simultaneously captured left and right images.

17. The method of claim 10, further comprising performing, by the controller, vehicle-to-vehicle transfer learning to further train the DNN.

18. The method of claim 10, wherein the labeled training data comprises a plurality of images of different types of landmarks that are manually labeled by a human annotator.

* * * * *